US 6,917,310 B2

(12) United States Patent
Pearson et al.

(10) Patent No.: US 6,917,310 B2
(45) Date of Patent: Jul. 12, 2005

(54) VIDEO DECODER AND ENCODER TRANSCODER TO AND FROM RE-ORDERABLE FORMAT

(75) Inventors: Eric C. Pearson, Conestogo (CA); Elliot N. Linzer, Suffern, NY (US); Lowell L. Winger, Waterloo (CA)

(73) Assignee: LSI Logic Corporation, Milpitas, CA (US)

( * ) Notice: Subject to any disclaimer, the term of this patent is extended or adjusted under 35 U.S.C. 154(b) by 86 days.

(21) Appl. No.: 10/603,550

(22) Filed: Jun. 25, 2003

(65) Prior Publication Data
US 2004/0263361 A1 Dec. 30, 2004

(51) Int. Cl.[7] .................................................. H03M 7/00
(52) U.S. Cl. ........................... 341/50; 341/107; 341/65
(58) Field of Search .............................. 341/50, 107, 65, 341/60; 375/240.24, 240.25

(56) References Cited

U.S. PATENT DOCUMENTS

2004/0066852 A1 * 4/2004 MacInnis ............... 375/240.25
2004/0085233 A1 * 5/2004 Linzer et al. ............... 341/107

* cited by examiner

Primary Examiner—Michael Tokar
Assistant Examiner—John B Nguyen
(74) Attorney, Agent, or Firm—Christopher P. Maiorana, P.C.

(57) ABSTRACT

A method for decoding an input bitstream is disclosed. The method generally includes the steps of (A) generating an intermediate bitstream having an intermediate encoded format by converting the input bitstream having an input encoded format and an input order, (B) storing the intermediate bitstream in the input order and (C) generating an output signal having an output order by decoding the intermediate bitstream.

31 Claims, 5 Drawing Sheets

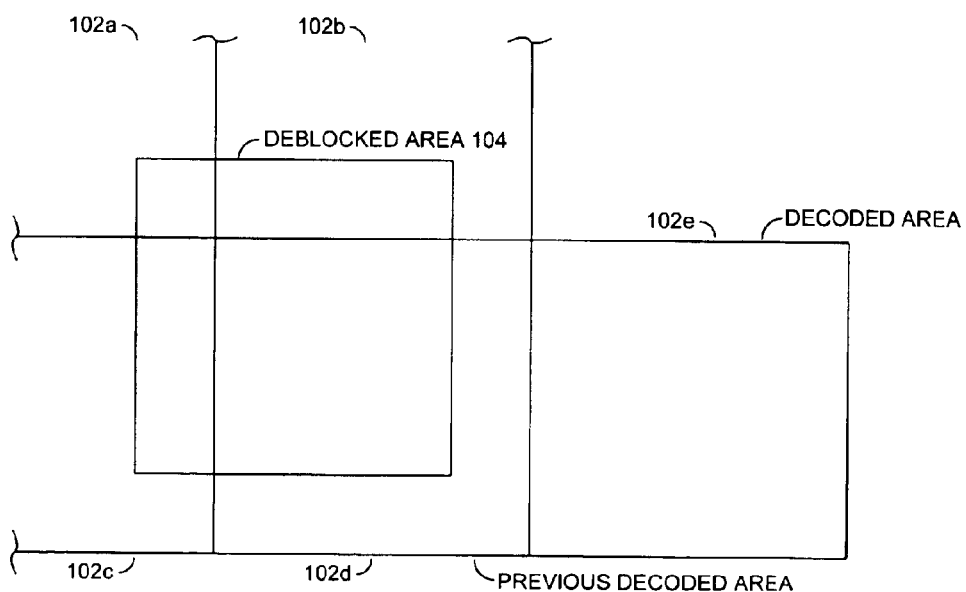

160

162

RETRIEVE MPEG-2 HUFFMAN REPRESENTATION OF TRANSFORM COEFFICIENTS AND BINARIZED NON-COEFFICIENTS

164

HUFFMAN DECODE THE TRANSFORM COEFFICIENTS

166

GENERATE BINARIZED TRANSFORM COEFFICIENTS AND SIGNIFICANCE MAP

168

CABAC ENCODE NON-COEFFICIENT DATA AND BINARIZED TRANSFORM COEFFICIENTS

FIG. 6

VIDEO DECODER AND ENCODER TRANSCODER TO AND FROM RE-ORDERABLE FORMAT

CROSS REFERENCE TO RELATED APPLICATIONS

The present application is related to co-pending application Ser. No. 10/284,498 filed Oct. 30, 2002.

FIELD OF THE INVENTION

The present invention relates to a bitstream format and order conversions generally, and more particularly, to a video decoder and encoder transcoder to and from a re-orderable format.

BACKGROUND OF THE INVENTION

Compression of digital video data is performed for many applications including transmission over bandwidth-constrained channels, such as direct broadcast satellite, and storage on optical media. To achieve very efficient compression, complex, computationally intensive processes are used for encoding (i.e., compressing) and decoding (i.e., decompressing) the digital video data. For example, though MPEG-2 (Moving Pictures Expert Group, International Organization for Standards, Geneva, Switzerland) is known as a very efficient method for compressing video, more efficient standards are being developed, such as the H.264 standard ("Advanced Video Coding", International Telecommunication Union Telecommunication Standardization Sector, Geneva, Switzerland).

Conventional video compression methods use some sort of entropy coding. Motion vectors and other overhead and transform coefficients are all compressed using entropy coding. Many types of well-known entropy compression techniques exist, including Huffman encoding and context-adaptive binary arithmetic coding (CABAC).

The H.264 standard obtains a higher efficiency in compression than MPEG-2. The H.264 standard is believed to utilize only 50–60% of the bit-rate used by MPEG-2 for the same quality of video. To achieve the higher efficiency, many sophisticated, processing intensive, tools are used with the H.264 standard. For example, MPEG-2 uses Huffman encoding, whereas H.264 supports both Huffman encoding and CABAC.

Another tool that H.264, MPEG-4 and H.263 ("Video Coding For Low Bit Rate Communications", International Telecommunication Union Telecommunication Standardization Sector, Geneva, Switzerland) uses is a deblocking loop filter. After a basic decoding (i.e., entropy decode, transform coefficient scaling, transform and motion compensation) a filter is applied to the decoded image to reduce the blocky appearance that compression can cause. The filtering is done "in the loop", that is, the filtered frame is used as a reference for frames that are subsequently decode and used for motion compensation.

The H.264 standard also allows macroblocks to be sent out of order. When the macroblocks are sent out of order and the CABAC format is used, the conventional methods do not allow for basic decoding and deblocking of the same picture in parallel. The reason is that the macroblocks in a CABAC stream cannot be decoded out of the original order. If the original transmission order is not a raster order, the decoding order cannot be the raster order. When conventional methods are used for decoding a stream that has out-of-order macroblocks and CABAC, basic decoding and deblocking cannot be performed in parallel. In a conventional approach where the decoding and deblocking are performed in series, the deblocking circuits or the decoding circuits will be idle at any given time and thus work twice as fast. When using special purpose hardware (i.e., application specific integrated circuits, application specific standard products and field programmable gate arrays), the hardware processes roughly twice as fast normal which significantly increases the cost and power consumption of the device.

SUMMARY OF THE INVENTION

The present invention concerns a method for decoding an input bitstream. The method generally comprising the steps of (A) generating an intermediate bitstream having an intermediate encoded format by converting the input bitstream having an input encoded format and an input order, (B) storing the intermediate bitstream in the input order and (C) generating an output signal having an output order by decoding the intermediate bitstream.

The objects, features and advantages of the present invention include providing a method and/or architecture for encoding and decoding that may provide for (i) an efficient method for decoding a bitstream that uses CABAC or similar methods for entropy encoding, (ii) an approach for decoding a bitstream where macroblocks are not sent in raster order, (iii) an approach for deblock filtering a bitstream in parallel with decoding the bitstream and/or (iv) an approach for converting a bitstream from a raster order to a non-raster order after encoding.

BRIEF DESCRIPTION OF THE DRAWINGS

These and other objects, features and advantages of the present invention will be apparent from the following detailed description and the appended claims and drawings in which:

FIG. 1 is a block diagram of a group of macroblocks;

FIG. 2 is a block diagram of a decoded set of macroblocks;

FIG. 6 is a flow diagram illustrating an example encode/conversion operation.

DETAILED DESCRIPTION OF THE PREFERRED EMBODIMENTS

Referring to FIG. 1, a block diagram of a group of macroblocks 100a–p is shown. To improve error resilience, options provided by the H.264 standard generally allow the macroblocks 100a–p to be sent out of order as illustrated by the sequence numbers 0–15 centered in each macroblock 100a–p. When the macroblocks 100a–p are sent out of order, the nominal normative decoding process may first perform basic decoding on an entire picture and then perform a deblocking loop filter on the entire picture. In some applications, methods may be used to perform basic decoding and deblocking of the same picture substantially simultaneously in parallel. Specifically, an encoded bitstream may be first parsed so that the location of each macroblock 100a–p in the encoded bitstream may be determined. The macroblocks 100a–p may then be decoded in raster order, which allows for the deblock filtering to be performed in parallel with the basic decoding.

Referring to FIG. 2, a block diagram of a decoded set of macroblocks 102a–e is shown. After a previously decoded area (e.g., macroblocks 102a–d) have been decoded, an area 104 of the same size as a single macroblock 102a–e, but above and to the left, may be deblock filtered while a next macroblock 102e is decoded. Filtering and decoding simultaneously generally works because all of the image area above and to the left of the previously decoded area (e.g., macroblock 102d) has already been decoded. Except for a beginning and an end of a picture, deblocking and decoding may be performed substantially simultaneously on different areas. Multiple advantages may result by not decoding the whole picture and then deblocking the whole picture. By providing a small amount of caching, the decoded picture may avoid being stored to a memory system and then reloaded. Therefore, the performance of the memory system may be reduced compared with other conventional approaches. Furthermore, if a special purpose circuit is used for the basic decoding and a separate special purpose circuit is used for the deblock filtering, both special purpose circuits may be used most of the time.

Figure 3:
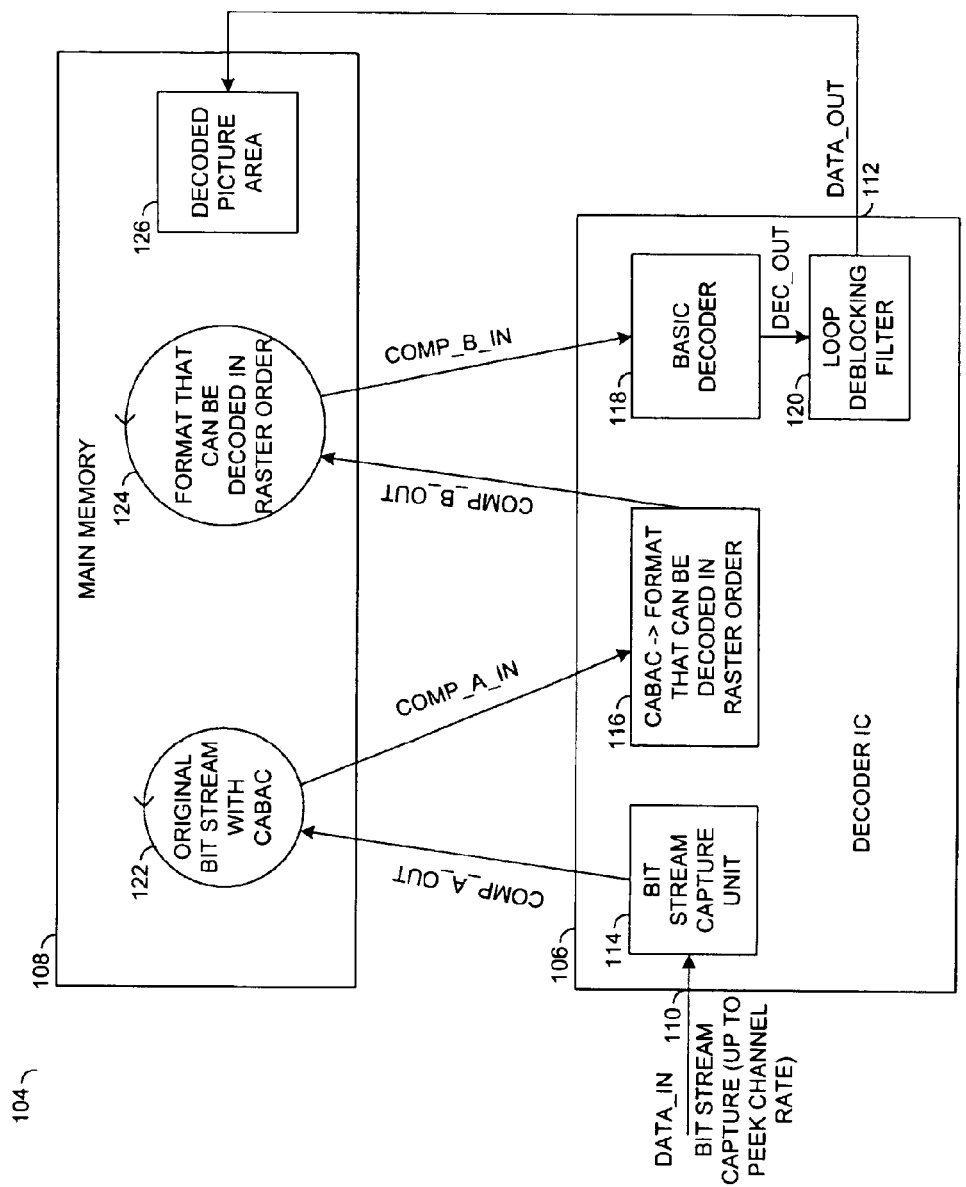
FIG. 3 is a block diagram of a system in accordance with a preferred embodiment of the present invention.

Referring to FIG. 3, a block diagram of a system 104 is shown in accordance with a preferred embodiment of the present invention. The system 104 may be implemented as a decoder system, apparatus or circuit. The decoder system 104 generally comprises a decoder circuit or block 106 and a memory circuit or block 108. The decoder circuit 106 may receive a bitstream signal (e.g., DATA_IN) at an interface 110. The decoder circuit 106 may include an interface 112 to present a bitstream signal (e.g., DATA_OUT). The bitstream signal DATA_IN may be implemented as an encoded bitstream. The bitstream signal DATA_OUT may be implemented as a digital video signal having macroblocks arranged in a raster order.

The decoder circuit 106 generally comprises a circuit or block 114, a circuit or block 116, a circuit or block 118 and a circuit or block 120. The circuit 114 may be implemented as a bitstream capture unit. The bitstream capture unit 114 may receive the input bitstream signal DATA_IN. An intermediate bitstream signal (e.g., COMP_A_OUT) may be generated by the bitstream capture unit 114 and transferred to the memory circuit 108. The memory circuit 108 may be operational to store or buffer all of, or up to a predetermined period of the signal COMP_A_OUT in a buffer 122. The buffer 122 may be implemented as a cyclic buffer.

The circuit 116 may be implemented as a converter circuit. In one embodiment, the converter circuit 116 may convert a bitstream from an encoded format that is un-decodable in an arbitrary sequence to another encoded format that is decodable in an arbitrary sequence. The converter circuit 116 may receive the data from the buffered signal COMP_A_OUT via an input bitstream signal (e.g., COMP_A_IN). The converter circuit 116 may be operational to convert the signal COMP_A_IN to another intermediate bitstream signal (e.g., COMP_B_OUT). The memory circuit 108 may be operational to store or buffer all of, or up to a predetermined period of the signal COMP_B_OUT in a buffer 124. The buffer 124 may be implemented as a cyclic buffer.

The circuit 118 may be implemented as a decoder circuit. The decoder circuit 118 may be operational to perform a basic decoding of the bitstream data in the buffer 124. An intermediate bitstream signal (e.g., COMP_B_IN) may transfer the data from the buffer 124 to the decoder circuit 118. The decoder circuit 118 may generate an output bitstream signal (e.g., DEC_OUT) by decoding the received signal COMP_B_IN.

The circuit 120 may be implemented as a deblocking loop filter circuit. The deblocking filter circuit 120 may be configured to filter the input signal DEC_OUT to generate the filtered output signal DATA_OUT. Operation of the deblocking filter circuit 120 is generally shown in FIG. 2. Other types of filtering may be implemented to meet the criteria of a particular application. A buffer 126 of the memory circuit 108 may be configured to store all of, or up to a predetermined period of the signal DATA_OUT.

The converter circuit 116, the decoder circuit 118 and the loop deblocking filter circuit 120 may operate substantially simultaneously to transform an encoded format and an order for the signal DATA_IN into another encoded format and another order for the signal DATA_OUT. For example, the signals DATA_IN, COMP_A_OUT and COMP_A_IN may be encoded with a context-adaptive binary arithmetic coding (CABAC) format. Likewise, the signals DATA_IN, COMP_A_OUT and COMP_A_IN may have a non-raster order for the macroblocks (as shown in FIG. 1). The converter circuit 116 may be configured to change the encoding format for the signal COMP_A_IN from the CABAC format to another format, such as a Huffman encoded format, for the signal COMP_B_OUT. Other encoding formats may be implemented to meet the criteria of a particular application.

By buffering the signal COMP_B_OUT in the buffer 124, the converter circuit 116 and the decoder circuit 118 may also change an order of the bitstreams. The signals DATA_IN, COMP_A_OUT and COMP_A_IN may carry macroblocks arranged in a non-raster order. Therefore, the macroblocks within the signal COMP_B_OUT may be written to the buffer 124 out-of-order relative to a respective picture. With the encoding format changed from CABAC to Huffman, the decoder circuit 118 may be configured to read the macroblocks from the buffer 124 in a different order, such as a raster order. Therefore, the signals COMP_B_IN, DEC_OUT and DATA_OUT may convey the macroblocks in a raster order. Since the signal DEC_OUT may have a raster order, the deblocking filter circuit 120 may be configured to filter the macroblocks for the pictures in the signal DEC_OUT substantially simultaneously as the decoder circuit 118 decodes the macroblocks from the signal COMP_B_IN. For example, while the decoder circuit 118 is operating on a particular row of macroblocks in a particular picture in raster order, the deblocking filter circuit 120 may be operating on the same particular row of macroblocks in the same particular picture substantially simultaneously.

For some compressed streams, decoding may be performed in any order. For example, encoded bitstreams using a fixed Huffman table may be decoded in an arbitrary sequence. If a starting position of a particular codeword is known, the decoding may begin from the particular codeword. For other types of bitstreams, out-of-order decoding may not be possible. For example, streams that use adaptive entropy coding generally cannot be decoded out of order or in an arbitrary sequence. Consider the following example of three symbols A, B and C. A table used at a start of the bitstream may be created as shown in TABLE I as follows:

TABLE I

| Symbol | Codeword Bit Pattern |
| --- | --- |
| A | 0 |
| B | 10 |
| C | 11 |

After a first symbol is decoded, the encoding method may swap the symbol used for the last decoded symbol with whatever symbol had the "0" codeword. For example, the bit sequence 0010 0011 0011 may be parsed as AABBBCCCB. The first "0" may be decoded as the symbol A. The second "0" may also be decoded as the symbol A. The next two bits "10" may be decoded as the symbol B. An exchange (e.g., A and B) may then take place in the table where the symbol B is thereafter represented by "0" and the symbol A is represented by "10". The symbol C may remain represented by "11".

For the next four bits, the first two "0"may each be decoded as the symbol B. The next two bits "11" may be decoded as the symbol C. A swap (e.g., C and B) may take place in the table where the symbol C is thereafter be represented by "0" and the symbol B is represented by "11". The symbol A may remain represented by "10".

For the third set of four bits, the first two "0"s may each be decoded as the symbol C. The next two bits "11" may be decoded as the symbol B. Another swap may be performed in the table after decoding two bits as the symbol B. Thereafter, the method may continue with additional bits from the bitstream. Because of the encoding method used in the above example, there is generally no way to decode M symbols of a bitstream starting at bit position N without first decoding the bits from position 0 to position N−1.

Overall, entropy coding streams for which the codewords are not clearly demarcated (e.g., for which a codeword cannot be identified as starting at a specific bit) generally cannot be decoded out of order. Examples of an entropy encoding may be arithmetic codes, content-adaptive binary arithmetic codes (CABAC) and context adaptive variable length codes (CAVLC). A CABAC or CAVLC stream generally cannot be decoded out of order for multiple reasons. The reasons may include (i) an adaptation used and (ii) the codewords may not be clearly demarcated. An example of a CABAC encoded bitstream may be an H.264 compliant bitstream. Other encoding methods may be implemented to meet a criteria of a particular application.

The system 104 generally takes a bitstream that cannot be decoded out of order and converts the bitstream to a second bitstream that may be decoded out of order. Criteria for the out-of-order "second bitstream" include, but is not limited to, (i) containing all the information in the original bitstream (e.g., a basic decoding may be performed to get the same pixel values as would have been decoded from the original stream), (ii) may be decoded on a macroblock basis in raster order and (iii) may not rely on the pixel values from previous frames. The third point generally allows sufficient transcoding to be performed ahead of time to allow for full parallelism between the conversion and the decoding and/or filtering. For example, a picture N may be transcoded (e.g., converted) while a picture N−1 may be decoded/deblocking filtered.

The transcoding may be performed at a channel rate of the input bitstream signal DATA_IN. An example of the transcoding may be found in the related patent application, Ser. No. 10/284,498, filed on Oct. 30, 2002 which is hereby incorporated by reference in its entirety. Example formats operated on by the transcoding may include, but are not limited to, (i) compressed symbols that may not use adaptation and may have discrete bits for codewords, (ii) uncompressed codewords (e.g., uncompressed transform coefficients, motion vectors, etc.) and (iii) prediction information (e.g., motion vectors) and a difference between the decoded pixels and predicted pixels, but not the predicted pixels themselves or the decoded pixels themselves.

Figure 4:
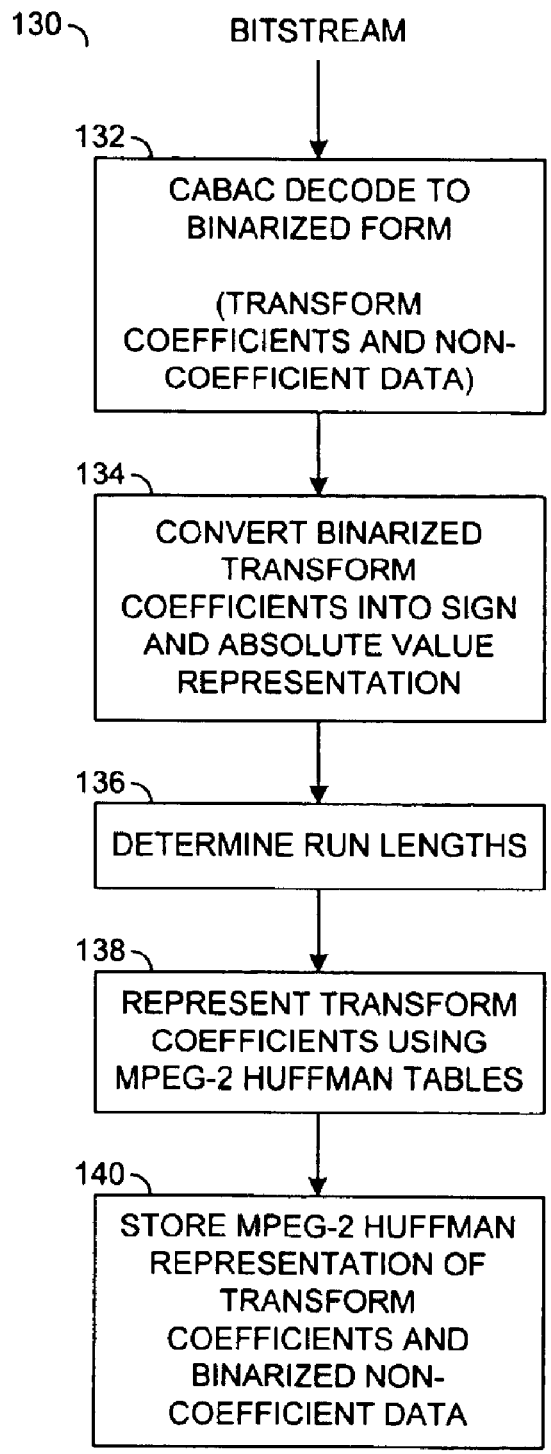
FIG. 4 is a flow diagram illustrating an example conversion operation.

Referring to FIG. 4, a flow diagram 130 illustrating an example conversion operation is shown. The CABAC encoded bitstream signal COMP_A_IN may be retrieved from the memory circuit 108 and decoded to a binarized form (e.g., the block 132). The binarized form may comprise transform coefficients and non-coefficient data. The binarized transform coefficients may be converted into a sign and absolute value representation (e.g., the block 134). The absolute value representations may use a fixed number of bits (e.g., 12). The coefficients may be broken down into a significance map. The significance map may be used to determine run lengths for the coefficients. The sign and absolute value representations and the run lengths may be used to represent the transform coefficients by applying MPEG-2 Huffman code tables (e.g., the block 138). The MPEG-2 Huffman representations of the transform coefficients and the binarized non-coefficient data that resulted from the CABAC decoding step 132 may be stored in another region of the,memory circuit 108 (e.g., the block 140). The non-coefficient data may include motion vector differences, macroblock headers as well as other data. In an alternative embodiment, the binarized form resulting from the CABAC decode (e.g., the block 132) may be sent to a buffer. In general, the result from the CABAC decode is a compressed representation. However, the compression is generally less than the bitstream input to the CABAC decode operation of the converter circuit 116.

Figure 5:
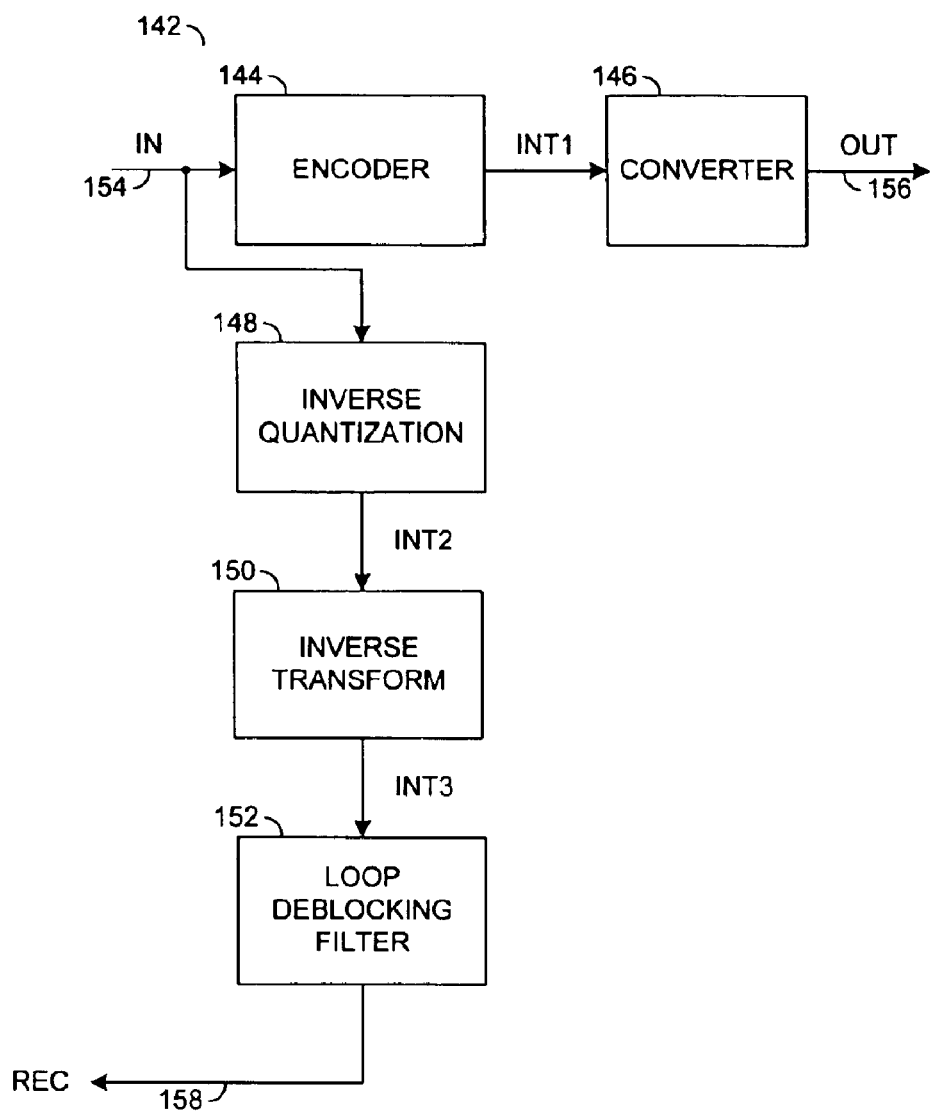
FIG. 5 is a block diagram of another system.

Referring to FIG. 5, a block diagram of a system 142 is shown. The system 142 may be implemented as an encoder system, apparatus or circuit. The encoder system 142 generally comprises a circuit or block 144, a circuit or block 146, a circuit or block 148, a circuit or block 150 and a circuit or block 152. The encoder system 142 may receive a bitstream signal (e.g., IN) at an interface 154. The encoder system 142 may generate an output bitstream signal (e.g., OUT) at an interface 156. An interface 158 may be provided in the encoder system 142 to present a reconstructed bitstream (e.g., REC). The bitstream signals IN and REC may be implemented as a digital video signal having macroblocks arranged in a raster order. The bitstream signal OUT may be implemented as an encoded bitstream having macroblocks arranged in a non-raster order.

The circuit 144 may be implemented as an encoder circuit. The encoder circuit 144 may be operational to encode the input bitstream signal IN to generate an intermediate bitstream signal (e.g., INT1). The bitstream signal IN and the bitstream signal INT1 may have the same order (e.g., raster order) for the macroblocks. The bitstream signal IN may be a non-encoded signal. The bitstream signal INT1 may have an encoded format that may allow for decoding in a random sequence. In one embodiment, the bitstream signal INT1 may have the Huffman encoded format. Other encoding formats may be implemented to meet the criteria of a particular application.

The circuit 146 may be implemented as a converter circuit. The converter circuit 146 may be operational to convert the encoding format and the macroblock order of the intermediate bitstream signal INT to generate the output bitstream signal OUT. Changes to the encoding format may result in the bitstream signal OUT being un-decodable in a random sequence. An example encoded format for the signal OUT may be the CABAC format. The converter circuit 146 may also be operational to rearrange a sequence or order of the macroblocks within the intermediate signal INT1. In one embodiment, the macroblocks may be reordered from a raster order in the bitstream signal INT1 to a non-raster order in the bitstream signal OUT.

The circuit 148 may be implemented as an inverse quantization circuit. The circuit 150 may be implemented as an inverse transform circuit. The inverse quantization circuit 148 and the inverse transform circuit 150 may be operational to reverse a discrete cosine transform (DCT) and a quantization function that may have been performed on the signal IN. The inverse quantization circuit 148 may generate an intermediate signal (e.g., INT2) from the signal IN. The inverse transform circuit 150 may be configured to generate another intermediate signal (e.g., INT3) from the signal INT2.

The circuit 152 may be implemented as a filter circuit. The filter circuit 152 may operate as a loop deblocking filter circuit. The deblocking filter circuit 152 may function similar to the deblocking filter circuit 120 from the decoder circuit 104 (see FIG. 3). The deblocking filter circuit 120 is generally configured to operate substantially simultaneously with the encoder circuit 144 to generate the signal REC in response to the signal IN while the encoder circuit 144 generates the signal INT1. For example, while the encoder circuit 144 is operating on a particular row of macroblocks in a particular picture in raster order, the deblocking filter circuit 120 may operation on the same particular row in the same picture substantially simultaneously.

Referring to FIG. 6, a flow diagram 160 illustrating an example encode/conversion operation is shown. A lossless entropy transcode process in accordance with the present invention may start by retrieving an MPEG-2 Huffman representation of transform coefficients and binarized non-coefficient data from a buffer holding the signal IN (e.g., the block 162). The encoded transform coefficients may be operated on by a Huffman decoder (e.g., the block 164). The decoded transform coefficients may be used to generate binarized transform coefficients and a significance map (e.g., the block 166). The binarized coefficients, the significance map and the non-coefficient data (e.g., motion vector differences, macroblock headers, etc.) may be encoded using a context based adaptive binary arithmetic (CABAC) encoder (e.g., the block 168). In an alternative embodiment, binarized data may be loaded directly into the block 168 and encoded using the CABAC encoder.

The encoder circuit 144 may first convert a fixed length symbol into a variable length binary representation referred to as variable length binarization. The variable length binary representation may be a Huffman code, where the representation of one symbol is generally not a prefix of another symbol. For example, in the-compression of transform coefficients (e.g., up to 12 bits), using CABAC on the binary representation of the transform coefficients is generally not efficient. A detailed description of CABAC as used in H.264 may be found in the Joint Final Committee Draft of the Joint Video Specification (ITU-T Rec. H.264 ISO/IEC 14496-10 AVC), which is hereby incorporated by reference in its entirety. Instead, a two step process may be used. First, a significance map may be generated, describing which coefficients are zero and which coefficients are non-zero. Second, the coefficients may be broken into a sign and absolute value.

Both the significance map and the coefficient absolute values may use variable length binarizations (or codes). For example, the absolute value of each coefficient may be coded as follows. When the absolute value (e.g., ABS) of the symbol is less than or equal to a predetermined value (e.g., 16), a corresponding binarization may be a string of ABS-1 ones followed by a zero. When ABS is greater than the predetermined value (e.g., 17, etc.), a corresponding binarization may be made up of two parts: (i) a prefix comprising a string of is and (ii) a suffix. The following

TABLE II

| Absolute value of coefficient | Binarization prefix | Suffix |
| --- | --- | --- |
| 1 | 0 | |
| 2 | 10 | |
| 3 | 110 | |
| 4 | 1110 | |
| 5 | 11110 | |
| 6 | 111110 | |
| 7 | 1111110 | |
| 8 | 11111110 | |
| 9 | 111111110 | |
| 10 | 1111111110 | |
| 11 | 11111111110 | |
| 12 | 111111111110 | |
| 13 | 1111111111110 | |
| 14 | 11111111111110 | |
| 15 | 111111111111110 | |
| 16 | 1111111111111110 | |
| 17 | 11111111111111110 | 0 |
| 18 | 11111111111111110 | 1 |
| 19 | 111111111111111110 | 00 |
| 20 | 111111111111111110 | 01 |
| 21 | 111111111111111110 | 10 |
| 22 | 111111111111111110 | 11 |
| 23 | 1111111111111111110 | 000 |
| 24 | 1111111111111111110 | 010 |

Breaking a block of coefficients into a significance map followed by sign and absolute value is generally a form of variable length (e.g., Huffman) compression. While this representation may take more bits than the direct (e.g., fixed length) binary representation of all coefficients, such a representation will generally be shorter when many coefficients are small. Similarly, using a variable length representation of ABS may use more bits than the direct binary representation. However, variable length representation of ABS may take fewer bits when the coefficients are generally small.

After converting symbols to the variable length binary representation, a CABAC encoder (e.g., the converter circuit 146) may reorder the macroblocks and then compress the bits of the binarization using adaptive arithmetic codes. Specifically, each bit may be compressed using arithmetic coding, where the probabilities for each bit may be estimated based on the values of previously encoded coefficients.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. A method for decoding an input bitstream, comprising the steps of:

(A) generating an intermediate bitstream having an intermediate encoded format by converting said input bitstream having an input encoded format and an input order;

(B) storing said intermediate bitstream in said input order; and (C) generating an output signal having an output order by decoding said intermediate bitstream.

2. The method according to claim 1, wherein said output order has a different sequence for a plurality of macroblocks than said input order.

3. The method according to claim 1, further comprising the step of:

generating a filtered signal by filtering said output signal.

4. The method according to claim 3, wherein the steps of decoding said intermediate bitstream and filtering said output signal are performed substantially simultaneously.

5. The method according to claim 3, wherein said filtered signal comprises a plurality of macroblocks and said output order comprises a raster order.

6. The method according to claim 1, wherein said input encoded format is un-decodable in an arbitrary sequence.

7. The method according to claim 6, wherein said intermediate encoded format is decodable in said arbitrary sequence.

8. A circuit comprising:

a converter configured to (i) generating an intermediate bitstream having an intermediate encoded format by converting an input bitstream having an input encoded format and an input order;

a memory configured to store said intermediate bitstream in said input order; and a decoder configured to generate an output signal having an output order by decoding said intermediate bitstream.

9. The circuit according to claim 8, wherein said output order has a different sequence for a plurality of macroblocks than said input order.

10. The circuit according to claim 8, further comprising:

a filter configured to generate a filtered signal by deblock filtering said output signal.

11. The circuit according to claim 10, wherein said filter operates on a picture in said output signal substantially simultaneously with said decoder operating on said picture in said intermediate bitstream.

12. The circuit according to claim 8, wherein said input encoded format comprises a content-adaptive binary arithmetic code format.

13. The circuit according to claim 12, wherein said intermediate encoding format comprises a Huffman format.

14. The circuit according to claim 13, wherein said input order comprises a non-raster order and said output order comprises a raster order.

15. The circuit according to claim 8, wherein said input encoded format is un-decodable in an arbitrary sequence.

16. A method for encoding an input signal, comprising the steps of:

(A) generating an intermediate bitstream having an input order and an intermediate encoded format by encoding said input signal having said input order; and (B) generating a reconstructed signal having said input order by filtering said input signal substantially simultaneously with encoding said input signal.

17. The method according to claim 16, wherein the steps of filtering and encoding substantially simultaneously are performed substantially simultaneously for a row in said input signal.

18. The method according to claim 16, further comprising the step of:

generating an output bitstream having an output order and an output encoded format by converting said intermediate bitstream.

19. The method according to claim 16, wherein said reconstructed signal comprises a plurality of macroblocks and said input order comprises a raster order.

20. The method according to claim 18, wherein said output encoded format is un-decodable in an arbitrary sequence.

21. The method according to claim 20, wherein said input encoded format is decodable in said arbitrary sequence.

22. The method according to claim 18, wherein said output order has a different sequence for a plurality of macroblocks than said input order.

23. The method according to claim 18, wherein generating said output bitstream comprises the sub-step of:

generating said output bitstream by reordering a sequence for a plurality of macroblocks in said intermediate bitstream.

24. A circuit comprising:

an encoder configured to generate an intermediate bitstream having an input order and an intermediate encoded format by encoding said input signal having said input order; and a filter configured to generate a reconstructed signal having said input order by filtering said input signal substantially simultaneously with encoding said input signal.

25. The circuit according to claim 24, wherein said filter comprises a deblocking filter.

26. The circuit according to claim 24, wherein said filter and said encoder operate on a picture in said input signal substantially simultaneously.

27. The circuit according to claim 24, wherein said intermediate encoding format comprises a Huffman format.

28. The circuit according to claim 24, further comprising a converter configured to generate an output bitstream having an output order and an output encoded format by converting said intermediate bitstream.

29. The circuit according to claim 28, wherein said output order has a different sequence for a plurality of macroblocks than said input order.

30. The circuit according to claim 28, wherein said output encoded format comprises a content-adaptive binary arithmetic coded format.

31. The circuit according to claim 28 wherein said output order comprises a non-raster order and said input order comprises a raster order.

* * * * *